(12) United States Patent
Sivaraman et al.

(10) Patent No.: US 11,756,564 B2
(45) Date of Patent: Sep. 12, 2023

(54) DEEP NEURAL NETWORK BASED SPEECH ENHANCEMENT

(71) Applicant: PINDROP SECURITY, INC., Atlanta, GA (US)

(72) Inventors: Ganesh Sivaraman, Atlanta, GA (US); Elie Khoury, Atlanta, GA (US)

(73) Assignee: PINDROP SECURITY, INC., Atlanta, GA (US)

( * ) Notice: Subject to any disclaimer, the term of this patent is extended or adjusted under 35 U.S.C. 154(b) by 990 days.

(21) Appl. No.: 16/442,279

(22) Filed: Jun. 14, 2019

(65) Prior Publication Data

US 2019/0385630 A1 Dec. 19, 2019

Related U.S. Application Data

(60) Provisional application No. 62/685,146, filed on Jun. 14, 2018.

(51) Int. Cl.
*G10L 21/0232* (2013.01)
*G10L 25/30* (2013.01)
*G06N 3/048* (2023.01)

(52) U.S. Cl.
CPC .......... *G10L 21/0232* (2013.01); *G06N 3/048* (2023.01); *G10L 25/30* (2013.01)

(58) Field of Classification Search
None
See application file for complete search history.

(56) References Cited

U.S. PATENT DOCUMENTS

| | | | |
|---|---|---|---|
| 4,628,529 A | 12/1986 | Borth et al. | |
| 5,319,736 A | 6/1994 | Hunt | |
| 6,289,309 B1 | 9/2001 | deVries | |
| 7,171,246 B2 | 1/2007 | Mattila et al. | |
| 7,224,810 B2 | 5/2007 | Brown | |
| 8,543,402 B1 | 9/2013 | Ma | |
| 9,633,671 B2 | 4/2017 | Giacobello et al. | |
| 9,685,155 B2 | 6/2017 | Hershey et al. | |
| 9,953,661 B2 | 4/2018 | Vickers | |
| 9,978,388 B2 | 5/2018 | Avendano et al. | |
| 10,218,327 B2 | 2/2019 | Jing | |
| 10,347,271 B2 * | 7/2019 | Nesta | G10L 25/30 |
| 10,504,539 B2 * | 12/2019 | Kaskari | G10L 25/78 |

(Continued)

FOREIGN PATENT DOCUMENTS

WO 2016038704 A1 3/2016

OTHER PUBLICATIONS

International Preliminary Report on Patentability, Ch. I, for PCT/US19/37142 dated Dec. 24, 2020 (8 pages).

(Continued)

*Primary Examiner* — Paul W Huber
(74) *Attorney, Agent, or Firm* — FOLEY & LARDNER LLP

(57) ABSTRACT

A computer may segment a noisy audio signal into audio frames and execute a deep neural network (DNN) to estimate an instantaneous function of clean speech spectrum and noisy audio spectrum in the audio frame. This instantaneous function may correspond to a ratio of an a-priori signal to noise ratio (SNR) and an a-posteriori SNR of the audio frame. The computer may add estimated instantaneous function to the original noisy audio frame to output an enhanced speech audio frame.

18 Claims, 8 Drawing Sheets

(56) References Cited

U.S. PATENT DOCUMENTS

| | | | |
|---|---|---|---|
| 11,003,987 B2* | 5/2021 | Roblek | G06N 3/08 |
| 2002/0107687 A1 | 8/2002 | Kemp | |
| 2007/0083365 A1 | 4/2007 | Shmunk | |
| 2016/0111107 A1 | 4/2016 | Erdogan et al. | |
| 2016/0284346 A1 | 9/2016 | Visser et al. | |
| 2016/0322055 A1 | 11/2016 | Sainath et al. | |
| 2017/0061978 A1 | 3/2017 | Wang et al. | |
| 2017/0365275 A1 | 12/2017 | Lee et al. | |

OTHER PUBLICATIONS

Manohar, et al.. "Speech enhancement in nonstationary noise environments using noise properties." Speech Communication 48.1 (2006): 96-109. Accessed on Jun. 13, 2019 from https://www.sciencedirect.com/science/article/abs/pii/S0167639305001998, 14 pages.

Notification of Transmittal of the International Search Report and the Written Opinion of the International Searching Authority, dated Oct. 18, 2019, in corresponding International Application No. PCT/US19/37142, 12 pages.

Extended European Search Report for EP 19819546.3 dated Feb. 14, 2022 (13 pages).

Gao et al., "Improving Deep Neural Network Based Speech Enhancement in Low SNR Environments", Computer Vision—ECCV 2020: 16th European Conference, Glasgow, UK, Aug. 23-28, 2020 : proceedings; Part of the Lecture Notes in Computer Science, ISSN 032-9743, Jan. 2015, vol. 9237, pp. 75-82, DOI: 10.1007/978-3-319-22482-4_9 (8 pages).

Zhao et al., "Perceptually Guided Speech Enhancement Using Deep Neural Networks", IEEE International Conference on Acoustics, Speech and Signal Processing, IEEE, Apr. 2018, pp. 5074-5078, DOI: 10.1109/ICASSP.2018.8462593 (5 pages).

First Examiner's Requisition on Canadian App. 3,099,805 dated Jun. 23, 2023 (4 pages).

* cited by examiner 202  204

300

400

Generate a training feature vector of an audio frame of a training audio signal, the training feature vector including values of a predetermined number of frequency channels of the audio frame and values of frequency channels of the audio frames on each side of the audio frame
802

Train a DNN utilizing the training feature vector to minimize a binary cross entropy loss function, the DNN having rectified linear unit activation function in the hidden layer nodes and a sigmoid activation function in the output layer
804

DEEP NEURAL NETWORK BASED SPEECH ENHANCEMENT

CROSS-REFERENCE TO RELATED APPLICATIONS

This application claims priority to U.S. Provisional Application No. 62/685,146, filed Jun. 14, 2018, which is hereby incorporated by reference in its entirety.

TECHNICAL FIELD

This application relates generally to processing speech signals and more specifically towards speech enhancement using deep neural networks.

BACKGROUND

Speech signals are generally susceptible to noise. The noise may be channel noise imparted by the networks carrying the speech signals (also referred to as audio signals). As another example, the noise may be background noise picked up by the transducer when speech is being captured to generate a speech signal. In some cases, the noise may be stationary with less varied noise spectrum throughout the duration of the speech signal. In other cases, the noise may be non-stationary with frequently changing noise spectrum at various points in the speech signal. To suppress the noise in the speech signal, various computer-implemented speech enhancement processes are employed. These speech enhancement processes attempt to suppress background (non-speech) noises and to improve the perceptual quality of speech.

Conventional computer-implemented speech enhancement processes have several technical shortcomings, especially when utilized for suppressing non-stationary noises. Many of the conventional methods depend on estimating the statistical properties of speech and noise signals. These methods often fail to track non-stationary noises that are commonly encountered in real-world scenarios. Other methods suffer from deletion of unvoiced consonants (e.g., plosives, fricatives, or sibilants) because these unvoiced consonants inherently have a noise like structure. Methods such as Wiener filtering and spectral subtraction suffer from an artifact called "musical noise," which refers to non-speech areas of a signal that sound like musical tones due to isolated peaks left in the noise spectrum after the spectral subtraction.

As such, a significant improvement over conventional computer-implemented methods for speech enhancement is desired.

SUMMARY

What is therefore desired are systems and methods that perform speech enhancement by suppressing non-stationary noise. What is further desired are systems and methods that do not delete unvoiced consonants while achieving noise reduction. Embodiments disclosed herein attempt to solve the aforementioned technical problems and may provide other solutions as well. A computer may segment a noisy audio signal into audio frames and execute a deep neural network (DNN) to estimate an instantaneous function (e.g., a logarithmic ratio) of clean speech spectrum and noisy audio spectrum in the audio frame. This instantaneous function may correspond to a ratio of an a-priori signal to noise ratio (SNR) and an a-posteriori SNR of the audio frame. The computer may add estimated instantaneous function to the original noisy audio frame to output an enhanced speech audio frame.

In an embodiment, a computer-implemented method comprises segmenting, by a computer, an audio signal into a plurality of audio frames; generating, by the computer, a feature vector for an audio frame of the plurality of audio frames, the feature vector including values of a predetermined number of frequency channels of the audio frame and values of frequency channels of a predetermined number of audio frames on each side of the audio frame; executing, by the computer, a deep neural network (DNN) on the feature vector to estimate an instantaneous function of a clean audio spectrum and a noisy audio spectrum of the audio frame; and generating, by the computer, an enhanced speech audio frame corresponding to the audio frame based on noisy audio spectrum of the audio frame and the estimated instantaneous function of the clean audio spectrum and the noisy audio spectrum of the audio frame.

In another embodiment, a system comprises a non-transitory storage medium storing a plurality of computer program instructions and a DNN; and a processor electrically coupled to the non-transitory storage medium and configured to execute the plurality of computer program instructions to: segment an audio signal into a plurality of audio frames; generate a feature vector for an audio frame of the plurality of audio frames, the feature vector including a predetermined number of frequency channels of the audio frame and frequency channels of a predetermined number of audio frames on each side of the audio frame; feed the feature vector to the DNN to estimate an instantaneous function of a clean audio spectrum and a noisy audio spectrum of the audio frame; and generate an enhanced speech audio frame corresponding to the audio frame based on noisy audio spectrum of the audio frame and the estimated instantaneous function of the clean audio spectrum and the noisy audio spectrum of the audio frame.

In yet another embodiment, a computer-implemented method comprises generating, by a computer, a training feature vector of an audio frame of a training audio signal, the training feature vector including values of a predetermined number of frequency channels of the audio frame and values of frequency channels of the audio frames on each side of the audio frame; and training, by the computer, a DNN utilizing the training feature vector to minimize a binary cross entropy loss function, the DNN having a sigmoid activation function in the output layer.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 8 shows a flow diagram of an illustrative method of training a DNN, according to an embodiment.

DETAILED DESCRIPTION

Figure 1:
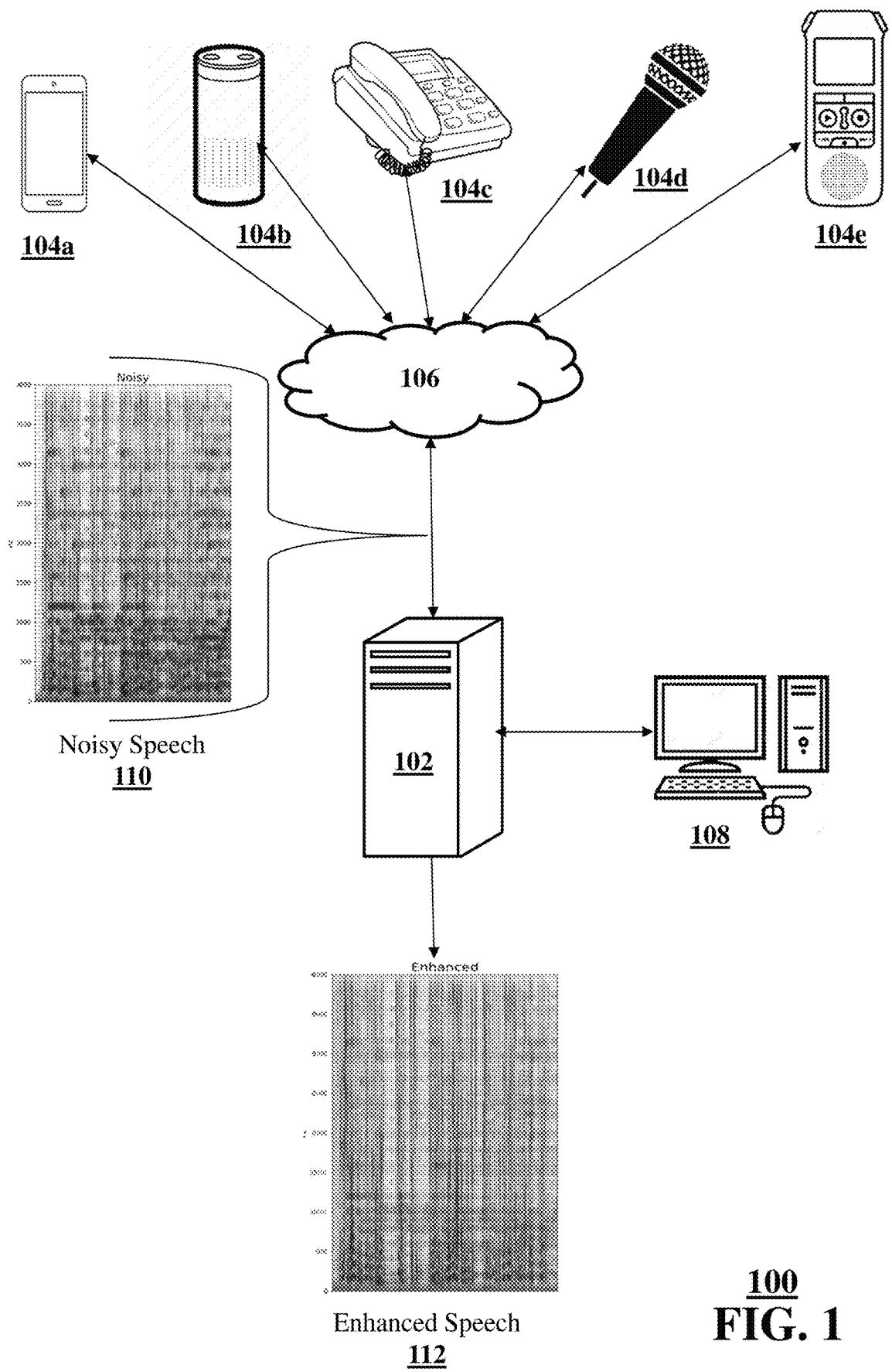
FIG. 1 shows an illustrative network environment for DNN based speech enhancement, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for Deep Neural Network (DNN) based speech enhancement. An illustrative computer may execute a trained DNN on feature vectors extracted audio frames of a noisy audio signal. The DNN may estimate an instantaneous function (e.g., logarithmic ratio) of a clean audio spectrum and a noisy audio spectrum of the audio frame. The computer may add the original noisy audio spectrum of the audio frame to the estimated instantaneous function of the clean audio spectrum and the noisy audio spectrum to generate an audio frame with enhanced speech. The noise suppression is therefore based upon the instantaneous noise spectrum, for example, the noise spectrum of the audio frame and the noise spectra of nearby audio frames. The estimated function is instantaneous because it is based upon the audio frame and nearby audio frames and not necessarily on a long run statistical properties. Therefore, embodiments disclosed herein provide significantly improved non-stationary noise tracking compared to the conventional systems and methods. Furthermore, these embodiments based upon the instantaneous function do not tend to delete unvoiced consonants unlike conventional systems and methods that use the long run statistical properties of the noise. It should be understood that the instantaneous logarithmic ratio described below is merely to illustrate an example of an instantaneous function. Other forms of instantaneous function should also be considered within the scope of this disclosure.

FIG. 1 shows an illustrative network environment 100 for a DNN based speech enhancement, according to an embodiment. It should be understood the components shown in the network environment 100 are merely illustrative, and additional, alternative, or fewer number of components should also be considered within the scope of this disclosure. The components within the network environment 100 may include a server 102, client devices 104a-104e (collectively or commonly referred to as 104), and a network 106.

The server 102 may be any kind of computing device performing one or more operations described herein. Non-limiting examples of the server 102 may include a server computer, a desktop computer, a laptop computer, a tablet computer, and a smartphone. At minimum, the server 102 may include a non-transitory storage medium storing computer program instructions and a processor to execute the computer program instructions. The non-transitory storage medium may be any kind of memory or storage devices such as random access memory (RAM) chips, hard disk drives, compact disk drives, and/or any type of storage medium. The processor may be any kind of processor such as an x86 processor, an Advanced RISC Machines (ARM) processor, and/or any other type of processor.

The client devices 104 may be any kind of electronic devices capable of recording, storing, and/or transmitting speech, e.g., in an audio signal. Non-limiting examples of client devices 104 may include a mobile phone 104a (e.g., a smartphone), an Internet of Things (IoT) device 104b (e.g., an intelligent voice assistant), a landline telephone 104c, a microphone 104d, and a voice recorder 104e. It should be understood that the aforementioned client devices 104 are merely illustrative and any electronic device capable of transducing speech into storable and transmittable signals should be considered within the scope of this disclosure. Furthermore, electronic devices configured for storing and/or transmitting such signals without necessarily having the transducer apparatus should also be considered within the scope of this disclosure. It should be understood that the signals described throughout in disclosure as audio signals are merely for the ease of explanation. Any kind of signal carrying speech such as a video signal should be considered within the scope of this disclosure.

The network 106 may be any kind of network, including any type of packet switching or circuit switching network. The network 106 may therefore contain any kind of packet switching or circuit switching communication links. These communication links may be either wired or wireless. For example, the network 106 may include packet switching networks such as a local area network (LAN), metropolitan area network (MAN), wide area network (WAN), and the Internet. The network 106 may include ad hoc networks/links such as a Bluetooth communication or a direct wired connection between a client device 104 and the server 102. The network 106 may also include circuit switching network as a telephony network containing the wired and/or the wireless telephony communication links. In other words, network of any order of complexity should be considered within the scope this disclosure.

A computer terminal 108 may be connected to the server 102. The computer terminal 108 may allow a system administrator to access the resources and the functionality of the server 102. The computer terminal 108 may also allow the system administrator to program/configure the server 102 to implement the functionality described throughout this disclosure. The computer terminal 108 may also present an interface for the system administrator to monitor the operation of the server 102 and/or perform other ancillary operations associated with the functionality described throughout this disclosure.

Although the network environment 100 is described as a client server mode, it should be understood that the description is for the ease of explanation. In some cases, the functionality divided between different components of the network environment 100 may be performed by different software modules in a single device. For example, a smartphone application may perform the speech enhancement operations described herein in a speech captured by the smartphone. In other cases, functionality described herein can be ascribed to multiple computing devices (e.g., multiple servers). Therefore, any configuration of computing devices should be considered within the scope of this disclosure.

In operation, the server 102 may receive a noisy speech 110 from the client devices 104 through the network 106. It should be understood that the server 102 may receive the noisy speech 110 through a direct connection or through several hops in the network 106. The noisy speech 110 may be included in any kind of signal such as an audio signal or a video signal. In some cases, the noisy speech 110 may be stored in the server 102 itself. Regardless the mode of receiving the noisy speech 110, the server may segment the signal (e.g., an audio signal) containing the speech into multiple frames. For example, a frame may be 32 milliseconds (ms) long with a 16 ms offset between successive frames. For each frame, the computer may generate a feature vector to be fed into a trained DNN stored in the server. A feature vector for a frame may include log filterbank energies of the frame and the log filterbank energies of five frames on each side of the frame, thereby containing log filterbank energies of 11 frames. After feeding the feature vector for the frame to the DNN, the server 102 may utilize the output of the DNN to estimate of an instantaneous logarithmic ratio of clean audio spectrum and a noisy audio spectrum for the frame. The server 102 may then add the noisy audio spectrum of the frame with the estimated instantaneous logarithmic ratio to generate enhanced speech frame. The server 102 may concatenate multiple enhanced speech frames to generate an enhanced speech 112. The server 102 may utilize the enhanced speech 112 for other aspects of audio processing or speech based fraud detection and/or authentication processes. For example, the server 102 may utilize the enhanced speech for a voice biometric process to identify a speaker associated with the speech.

The following description provides the mathematical basis for the embodiments in this disclosure. Let X[n] represent an input noisy signal speech spectrum at frame n. Let S[n] represent a corresponding clean speech spectrum and let D[n] represent background noise spectrum. For the embodiments where noise is additive to the clean speech, X[n] may be expressed as:

$$X[n]=S[n]+D[n]$$

where X[n], S[n], and D[n] may be vectors of K dimensions with K being number of frequency channels in the frame. In an embodiment K may be 129 for an audio signal with 8 KHz sampling rate.

A target of a deep neural network may be defined as a ratio between a the clean speech spectrum and the noisy speech spectrum:

$$Y[n] = \frac{|S[n]|^2}{|X[n]|^2}$$

where Y[n] may also be a vector of K dimensions.

In a log magnitude domain, the log of the ratio Y[n] may be the difference between the log filterbank energies (or log spectrograms) of the clean signal (also referred to as clean audio signal) and the noisy signal (also referred to as noisy audio signal). Or, mathematically:

$$\log\{Y[n]\}=\log\{|S[n]|^2\}-\log\{|X[n]|^2\}$$

Figure 2:
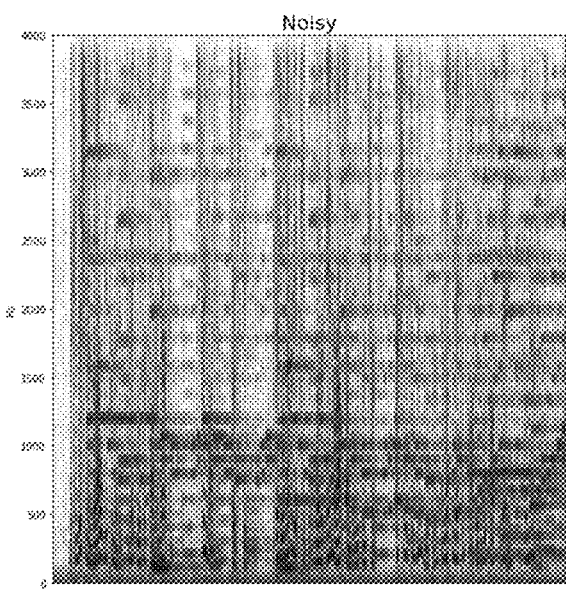
FIG. 2 shows illustrative noisy log spectrogram of an audio signal and a corresponding log spectrogram of a ratio of clean spectrum and noisy spectrum, according to an embodiment.
Figure 2:
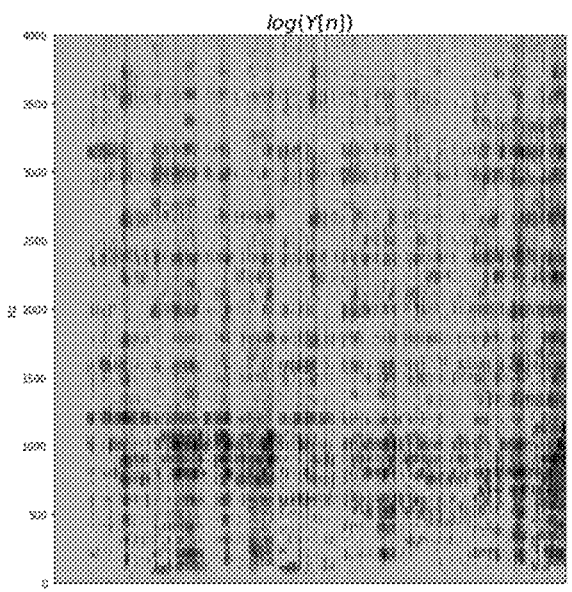

FIG. 2 shows illustrative filterbank energies. In particular, graph 202 shows noisy log spectrogram $\log\{|X[n]|^2$ and graph 204 shows corresponding $\log\{Y[n]\}$. It should be understood that $\log\{Y[n]\}$ may have lower values for regions where noise dominates and higher values for regions speech dominates.

A trained DNN may estimate $(\log\{\hat{Y}[n]\})$, more specifically a warped function of $(\log\{\hat{Y}[n]\})$ as detailed below. A computer may then recover the enhanced version of the speech $\hat{S}[n]$ by adding the DNN estimate $(\log\{\hat{Y}[n]\})$ to the input noisy log spectrum $\log\{|X[n]|^2\}$. Mathematically:

$$\log\{|\hat{S}[n]|^2\}=\log\{|X[n]|^2\}+\log\{\hat{Y}[n]\}$$

An instantaneous (e.g., local or for the frame n) a-posteriori signal to noise ratio (SNR) and an instantaneous a-priori SNR may be defined as follows:

$$SNR_{post}[n] = \frac{|X[n]|^2}{E\{|D[n]|^2\}}$$

$$SNR_{priori}[n] = \frac{|S[n]|^2}{E\{|D[n]|^2\}}$$

where $SNR_{post}$ may represent the instantaneous a-posteriori SNR and $SNR_{priori}$ may represent the instantaneous a-priori SNR. Conventional speech enhancement algorithms (e.g., Wiener filtering, minimum mean square error (MMSE) estimator) may require an accurate estimation of the a-priori or the a-posteriori SNR. Furthermore, conventional speech enhancement algorithms focus on estimating the noise spectrum $E\{|D[n]|^2\}$ or the a-priori SNR. In contrast, the embodiments disclosed herein may be based upon estimated ratio of $SNR_{post}$ and $SNR_{priori}$ because Y[n] may be written as:

$$Y[n] = \frac{SNR_{priori}[n]}{SNR_{post}[n]}$$

The logarithm of the aforementioned logarithmic ratio $\log\{Y[n]\}$ may be a real valued signal with values ranging from −7.0 to 4.0. One way to train a DNN to estimate $\log\{Y[n]\}$ may be to use to the mean-squared error criterion. However, such multivariate regression may be highly non-linear and challenging for the DNN to learn. Because the estimates are unconstrained in a multivariate regression, there may be several sub-optimal local minima (of the loss function) where the DNN may get converge during training. Binary outputs or values constrained between 0 and 1 may be easier to train. Therefore, embodiments disclosed herein transform the real valued Y[n] to a soft-mask function (also referred to as a mask function) M[n], which may have values constrained in the range of [0, 1]. The soft-mask function M[n] may be similar to a binary mask that may suppress spectrogram regions dominated by noise and enhance (or pass) regions dominated by speech. The following expression may be the transformation applied to Y[n] to obtain M[n].

$$M[n] = \frac{1}{1 + e^{-\alpha(\log\{Y[n]\} - \beta)}}$$

where the parameters α and β may be chosen heuristically. It should be understood that the above expression defining M[n] may be invertible to obtain Y[n] from M[n].

Figure 3:
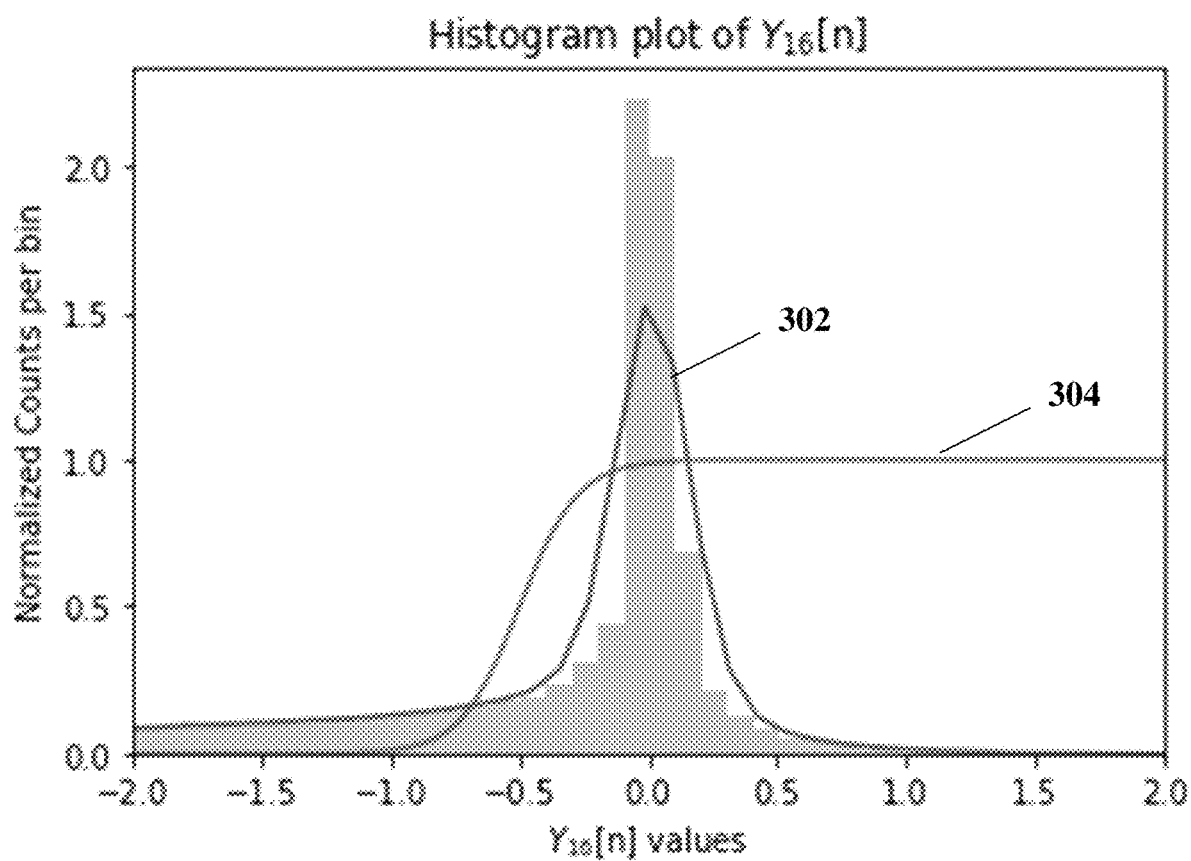
FIG. 3 shows an illustrative histogram plot of a frequency bin of a noisy audio signal, according to an embodiment.

FIG. 3 shows a histogram plot 300 to illustrate the principles of heuristic choice of values of the parameters α and β for M[n]. In particular, the histogram plot 300 shows the values of $Y_{16}[n]$, i.e., the difference between the log filterbank energies of the clean signal and the noisy signal for the $16^{th}$ frequency channel. In the histogram plot 300, the distribution has a heavy tail on the left side (e.g., values below −0.5) as shown by the distribution function 302. The higher values of $Y_{16}[n]$ may correspond to spectro-temporal windows that are dominated by speech regions whereas the lower values may correspond to spectro-temporal windows dominated by noise. It should be understood that the objective of the soft-mask function (e.g., M[n]) may be to discriminate between the speech dominated regions and the noise dominated region. A sigmoidal warping function 304 may set a soft threshold at −0.5 and may push the values of $Y_{16}[n]$ towards the extremities of 0 and 1. The sigmoid warping function 304 may be the M[n] (in this case $M_{16}[n]$) to constrain the values of $Y_{16}[n]$ between 0 and 1.

Figure 4:
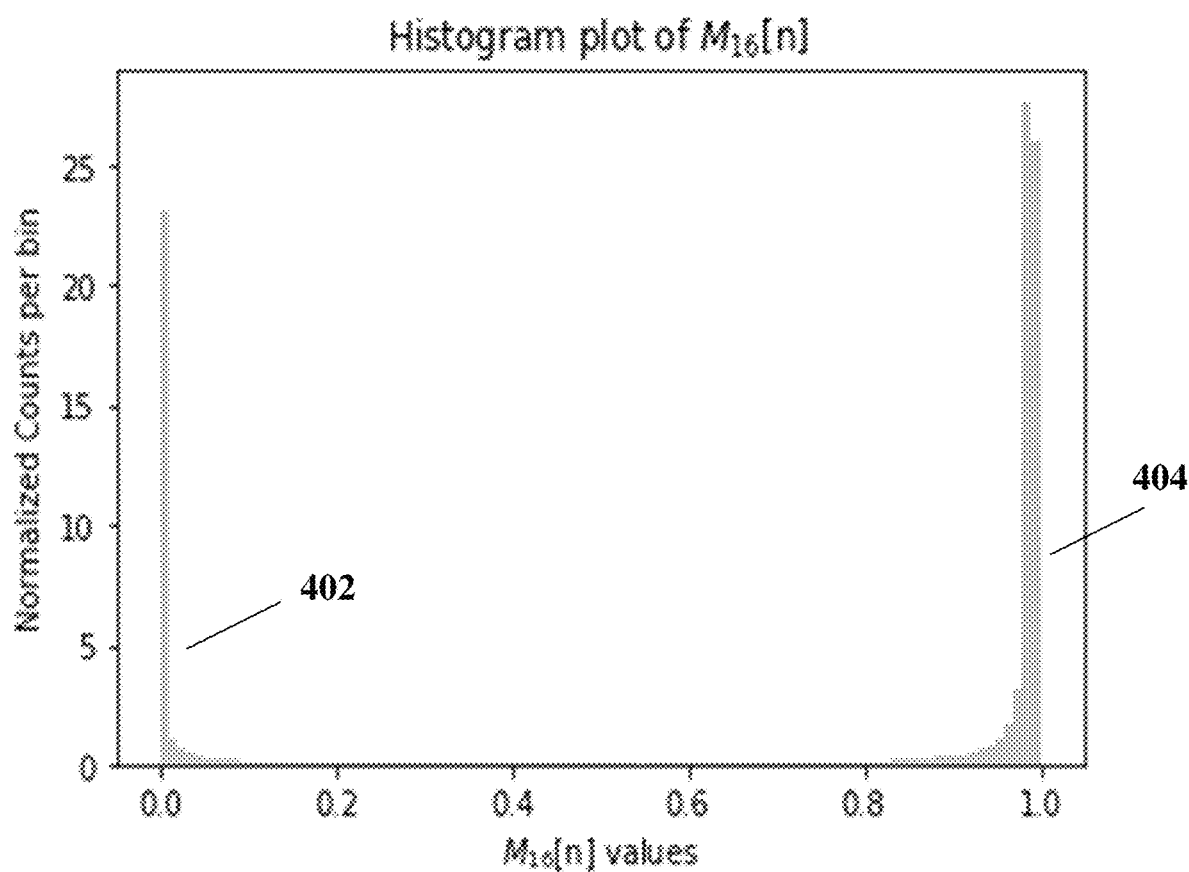
FIG. 4 shows an illustrative histogram plot of a soft-mask function for a frequency bin of a noisy audio signal, according to an embodiment.

FIG. 4 shows a histogram plot 400 of the $16^{th}$ channel of the mask function M[n] (i.e., $M_{16}[n]$). As shown, the majority of the values are close to either close to 0 or 1. For example, a first cluster of values 402 is close to 0 and a second cluster of values 404 is close to 1. It should be understood that although not seen in FIG. 4, there may be other values of $M_{16}[n]$ between the first cluster of values 402 and the second cluster of values 404.

Figure 5:
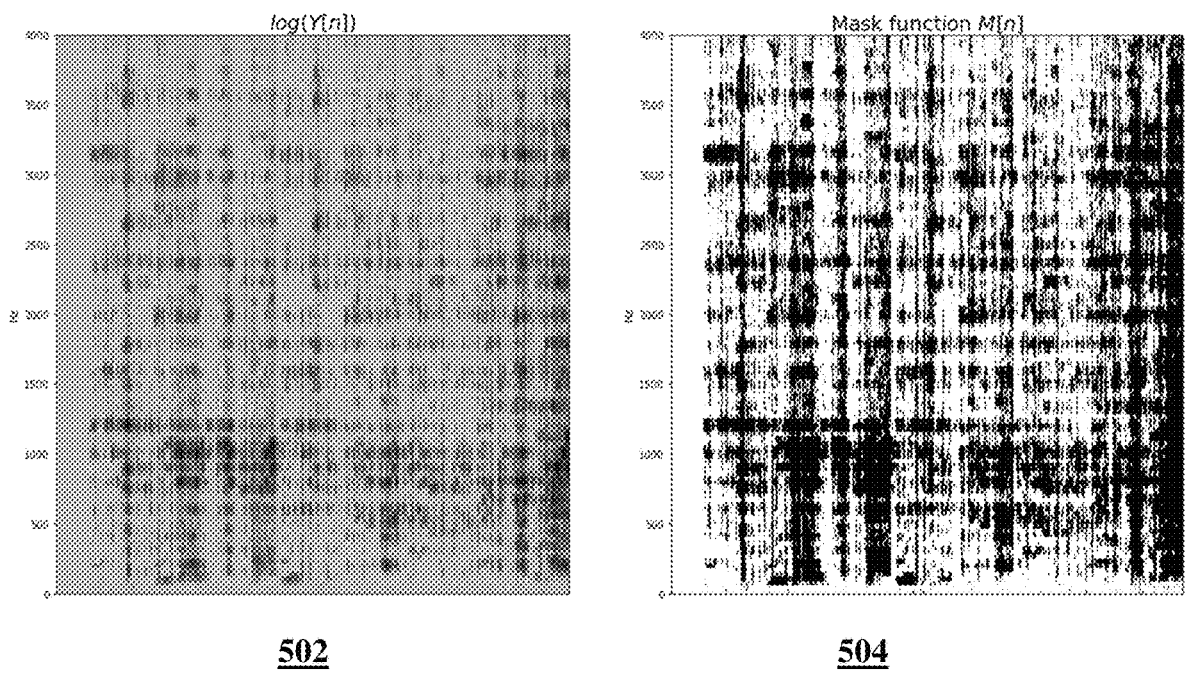
FIG. 5 shows illustrative log spectrogram of ratio of clean spectrum and noisy spectrum and a spectrogram of a corresponding soft-mask function, according to an embodiment, according to an embodiment.

FIG. 5 shows a histogram plot 502 of log{Y[n]} and a histogram plot 504 of the mask function M[n]. The histogram plot 502 is the histogram plot 204 of log{Y[n]} shown in FIG. 2 and the histogram plot 504 is of the corresponding mask function M[n].

Figure 6:
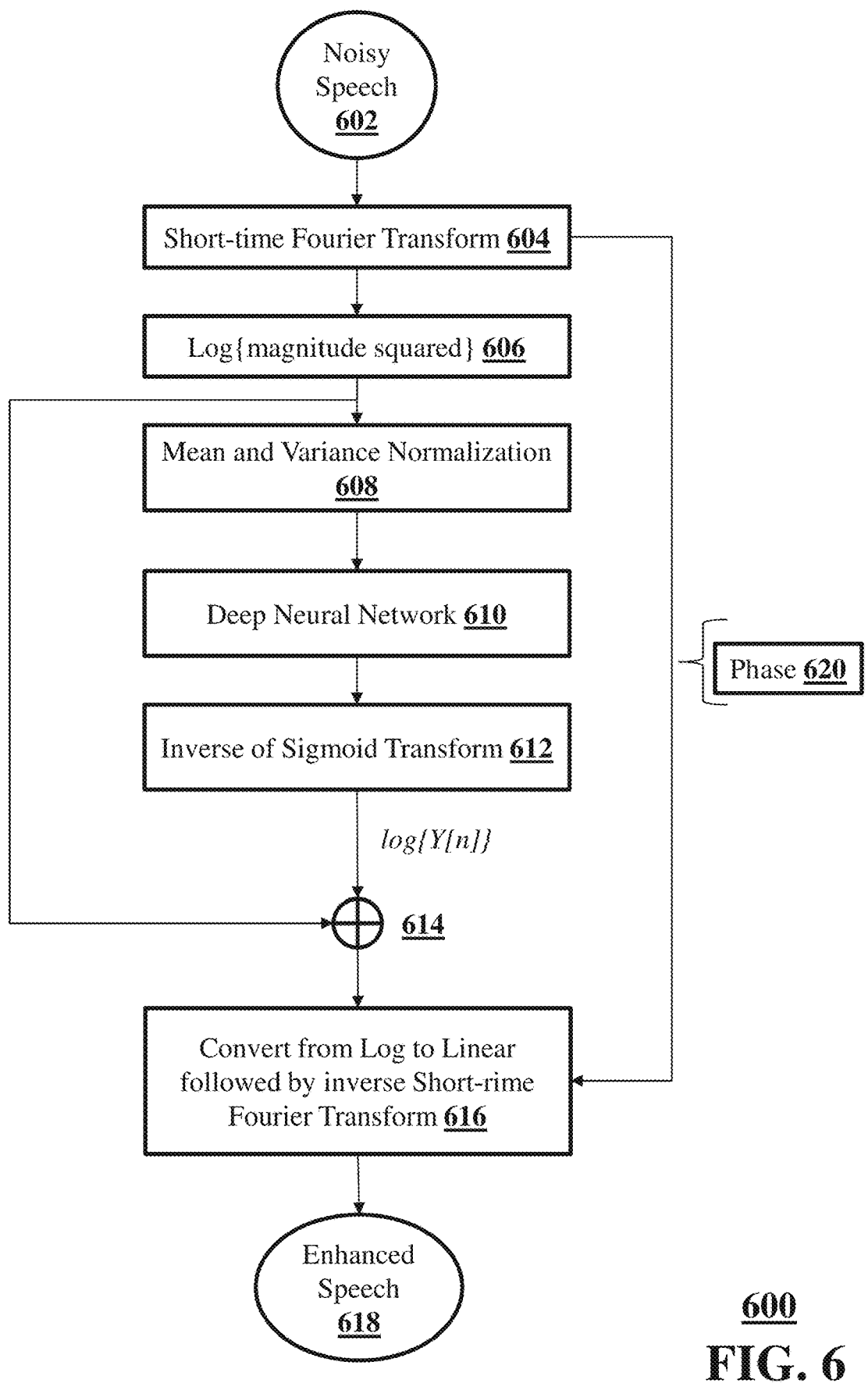
FIG. 6 shows a flow diagram of an illustrative method of DNN based speech enhancement, according to an embodiment.

FIG. 6 shows a process diagram of an illustrative method 600 of generating enhanced speech from a noisy speech, according to an embodiment. It should be understood the steps shown and described are merely illustrative and additional, alternate, or a fewer number of steps should also be considered within the scope of this disclosure. Although multiple computers may execute various steps of the method 600, the following describes a single computer executing the described steps.

The method starts at step 602, where the computer may receive a noisy speech. The noisy speech may be in an audio signal received from devices such as smartphones or landlines. The noisy speech may be in a recorded audio signal stored in any form of non-transitory storage medium. It should be understood that these sources of the noisy speech are merely illustrative and noisy speech within any real-time or recorded media should be within the scope of this disclosure.

At next step 604, the computer may perform short-time Fourier transform (STFT) of the noisy speech. By performing the STFT, the computer may determine the sinusoidal frequencies and phases on a per-frame basis of the noisy speech. In other words, the computer may segment the signal containing the noisy speech into frames and calculate the STFT of each frame. As an illustration, a frame may be of 32 milliseconds (ms) with a frame shift of 16 ms. At next step 606, the computer may calculate the log magnitude squared for a corresponding vector of values generated by the STFT for each frame. At a next step 608, the computer may perform mean and variance normalization for the vector of values generated by the STFT of the frames of the noisy speech. The computer may normalize the values such that the mean or the average value is 0 and the standard deviation is 1.

At a next step 610, the computer may execute a deep neural network (DNN) on the mean and variance normalized vectors corresponding to the noisy speech. These vectors may form the feature vectors to be input to the DNN. In an embodiment, the computer may use a predetermined number of frames on each side of a frame being processed to generate feature vectors. In a non-limiting example, the computer may utilize five frames on each side of the frame being processed. If the frame includes 129 frequency channels, the feature vector may be a one-dimensional vector containing 129*5 (for preceding five frames)+129*5 (for succeeding five frames)+129 (for the current frame), i.e., 129*11=1419 values.

At a next step 612, the computer may calculate an inverse of a sigmoid transform of the output of the DNN. The output of the DNN may be constrained between 0 and 1 because of the soft-mask sigmoid function M[n] in the output layer of the DNN. The computer may perform an inverse sigmoid transfer to calculate an instantaneous logarithmic ratio of a clean audio spectrum and a noisy audio spectrum $$\left(\log\{Y[n]\} = \log\left\{\frac{|S[n]|^2}{|X[n]|^2}\right\} = \log\{|S[n]|^2\} - \log\{|X[n]|^2\}\right)$$

of the input noisy speech. At a step 614, the computer may add the log magnitude squared of the STFT of the input signal ($\log\{|X[n]|^2\}$) to log{Y[n]} to generate an enhanced speech frame. It should be understood that the enhanced speech frame may be in a logarithmic format. At a next step 616, the computer may convert the enhanced speech frame from the logarithmic format to linear format. The computer may then perform an inverse STFT (iSTFT) to recreate the enhanced speech frame in the time domain. The computer may use a phase information 620 from the STFT step 604 to perform the iSTFT operations. It should however be understood that the computer using the phase information 620 of the noisy signal to recreate the enhanced speech frame is merely for illustration. In an embodiment, the computer may perform a DNN based phase enhancement. For example, the computer may use a DNN based system to estimate a phase of a clean signal from the phase of a noisy signal. In this DNN based (phase enhancement) system, the computer may feed as inputs magnitude and phase of the noisy signal, and optionally, output of a magnitude enhancement DNN (e.g., the speech enhancement DNN described above). The DNN based system may estimate a function of the phases of the clean and the noisy signal. The computer may then utilize the function of the phases of the clean and the noisy signal to compute the phase of the clean signal. At a next step 618, the computer may output enhanced speech. The enhanced speech may include concatenated enhanced speech frames in the time domain.

Figure 7:
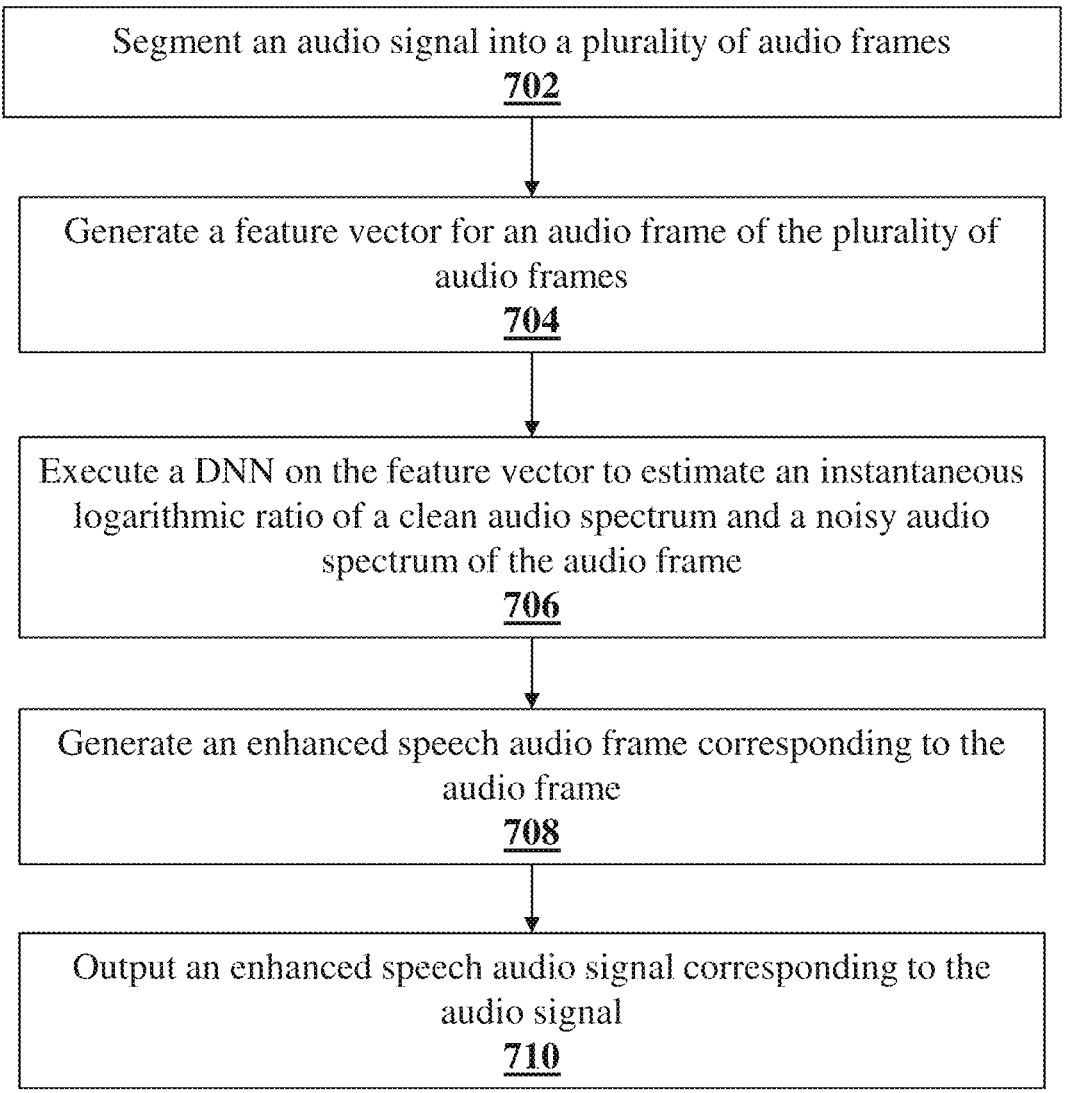
FIG. 7 shows a flow diagram of an illustrative method of DNN based speech enhancement, according to an embodiment.

FIG. 7 shows a flow diagram of an illustrative method 700 of DNN based speech enhancement, according to an embodiment. It should be understood the steps shown and described are merely illustrative and additional, alternate, or a fewer number of steps should also be considered within the scope of this disclosure. Although multiple computers may execute various steps of the method 700, the following describes a single computer executing the described steps.

The method may begin at step 702, where the computer may segment an audio signal into a plurality of audio frames. In an example, the each audio frame may be 32 ms long with 16 ms offset in between the audio frames. At a next step 704, the computer may generate a feature vector for an audio frame of the plurality of audio frames. The feature vector may include the values of a predetermined number of frequency channels of in the audio frame. For context, the feature vector may further include values of frequency channels of predetermined number of audio frames on each side of the audio frame. For example, the feature vector may include values of the frequency channels of five audio frames preceding the audio frame and frequency channels of five audio frames succeeding the audio frame.

At a next step 706, the computer may execute a DNN on the feature vector to estimate an instantaneous logarithmic ratio of a clean audio spectrum and a noisy audio spectrum of the audio frame. The DNN may output a vector with values between 0 and 1 because the output layer may contain a sigmoid soft-mask function to constrain the output values. The computer may perform an inverse sigmoid transform to generate the estimated instantaneous logarithmic ratio.

At a next step 708, the computer may generate an enhanced speech audio frame corresponding to the audio frame. The computer may generate the enhanced speech audio frame by adding the noisy audio spectrum of the audio frame to the estimated instantaneous logarithmic ratio of the clean audio spectrum and the noisy audio spectrum of the audio frame.

At a next step 710, the computer may output an enhanced speech audio signal corresponding to the audio signal. The computer may generate the enhanced speech audio signal by concatenating enhanced speech audio frames corresponding the plurality of audio frames. The computer may output the enhanced speech audio signal to other functions such as authentication function based upon voice biometrics that uses speech as an input.

FIG. 8 shows a flow diagram of an illustrative method 800 of training a DNN, according to an embodiment. It should be understood the steps shown and described are merely illustrative and additional, alternate, or a fewer number of steps should also be considered within the scope of this disclosure. Although multiple computers may execute various steps of the method 800, the following describes a single computer executing the described steps.

The method may begin at step 802, where the computer may generate a training feature vector of an audio frame of a training audio signal. The training audio signal may be part of a dataset of an artificially created noisy speech data. In an illustrative training embodiment, the dataset may be based upon librispeech dataset. Noises randomly chosen from 100 different environmental noises were added to the librispeech dataset. For example, pop and classical music files from the Musan dataset were used to corrupt the speech in the librispeech dataset with music noise. In this training embodiment, 20 different noise types were used. These added noises had randomly chosen SNRs selected from 5, 10, 10, and 30 dB (decibels). The cross validation and test sets were also created similarly using the Librispeech cross validation and test splits.

The training feature vector of the audio frame may be based upon 11 frames of log filterbank energies spliced together. The computer may compute a 256-point Fast Fourier Transform (FFT) of 32 ms frames of audio with a frame shift of 16 ms. The computer may then compute the logarithm of the magnitude squared of the FFT to get the log filterbank energies. The computer may concatenate five frames of features (i.e., logarithm of the magnitude squared of the FFT) on either side of the audio frame to generate the spliced input training feature vector of the audio frame. In an embodiment, the sampling rate of the training audio signal may be 8 KHz and each audio frame may include 129 frequency channels. In this embodiment, the size of the training feature vector for a frame may be 129 frequency channels*11 frames=1419.

At a next step 804, the computer may train a DNN utilizing the training feature vector. In an embodiment, the DNN may contain 5 hidden layers with 1024 nodes in each hidden layer. Each node in the DNN may use a rectified linear unit activation function. The output layer may have a sigmoid activation function to constrain the output values between 0 and 1. The computer may train the DNN with a binary cross entropy loss function with an Adam optimizer.

The computer may also train the DNN in association with a voice activity detector (VAD). In an embodiment, the computer may train the VAD and the speech enhancement DNN jointly. For example, the computer may add VAD target (the output value to evaluate the loss function) to the speech enhancement DNN target and perform a joint training. In another embodiment, the computer may utilize the estimates of the speech enhancement DNN as input feature vectors to train the VAD. In yet another embodiment, the computer may augment the speech enhancement DNN with additional layers to train the VAD while keeping the layers belonging to the speech enhancement DNN fixed. It should be understood that these training methods are merely illustrative and other methods of training the speech enhancement DNN with the VAD should be considered within the scope of this disclosure. The computer may use the trained network (e.g., any of the combination of the speech enhancement DNN and the VAD) to perform combined speech enhancement and voice activity detection operations. For example, the computer may use the trained network to estimate a frame-wise instantaneous function for speech enhancement along with estimate frame-wise voice activity.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   segmenting, by a computer, an audio signal into a plurality of audio frames;
   generating, by the computer, a feature vector for an audio frame of the plurality of audio frames, the feature vector including values of a predetermined number of frequency channels of the audio frame and values of frequency channels of a predetermined number of audio frames on each side of the audio frame;
   executing, by the computer, a deep neural network (DNN) on the feature vector to estimate an instantaneous function of a clean audio spectrum and a noisy audio spectrum of the audio frame; and
   generating, by the computer, an enhanced speech audio frame corresponding to the audio frame based on noisy audio spectrum of the audio frame and the estimated instantaneous function of the clean audio spectrum and the noisy audio spectrum of the audio frame.

2. The computer-implemented method of claim 1, further comprising:
   outputting, by the computer, an enhanced speech audio signal corresponding to the audio signal and containing enhanced speech audio frame.

3. The computer-implemented method of claim 1, further comprising:

estimating, by the computer, a frame-wise voice activity in association with estimating the instantaneous function of the clean audio spectrum and the noisy audio spectrum.

4. The computer-implemented method of claim 1, wherein the instantaneous function of the clean audio spectrum and the noisy audio spectrum of the audio frame corresponds to a ratio of an a-priori signal-to-noise ratio (SNR) and an a-posteriori SNR of the audio frame.

5. The computer-implemented method of claim 1, wherein the output layer of the DNN has a sigmoid activation function to constrain values in an output vector of the DNN between 0 and 1.

6. The computer-implemented method of claim 5, further comprising:
estimating, by the computer, the instantaneous function by applying an inverse of the sigmoid activation function to the output vector of the DNN.

7. The computer-implemented method of claim 1, wherein the step of generating the feature vector of the audio frame further comprises:
performing, by the computer, mean and variance normalization of corresponding values in the frequency channels of the audio frame.

8. The computer-implemented method of claim 1, wherein the instantaneous function is a logarithmic ratio of the clean audio spectrum and the noisy audio spectrum of the audio frame.

9. The computer-implemented method of claim 1, wherein the DNN is trained with a binary cross entropy loss function.

10. A system comprising:
a non-transitory storage medium storing a plurality of computer program instructions and a trained deep neural network (DNN); and
a processor electrically coupled to the non-transitory storage medium and configured to execute the plurality of computer program instructions to:
segment an audio signal into a plurality of audio frames;
generate a feature vector for an audio frame of the plurality of audio frames, the feature vector including a predetermined number of frequency channels of the audio frame and frequency channels of a predetermined number of audio frames on each side of the audio frame;
feed the feature vector to the DNN to estimate an instantaneous function of a clean audio spectrum and a noisy audio spectrum of the audio frame; and
generate an enhanced speech audio frame corresponding to the audio frame based on noisy audio spectrum of the audio frame and the estimated instantaneous function of the clean audio spectrum and the noisy audio spectrum of the audio frame.

11. The system of claim 10, wherein the processor is configured to further execute the plurality of computer program instructions to:
output an enhanced speech audio signal corresponding to the audio signal and containing enhanced speech audio frame.

12. The system of claim 10, wherein the processor is configured to further execute the plurality of computer program instructions to:
estimate a frame-wise voice activity in association with estimating the instantaneous function of the clean audio spectrum and the noisy audio spectrum.

13. The system of claim 10, wherein the instantaneous function of the clean audio spectrum and the noisy audio spectrum of the audio frame correspond to a ratio of an a-priori signal-to-noise ratio (SNR) and an a-posteriori SNR of the audio frame.

14. The system of claim 10, wherein the output layer of the DNN has a sigmoid activation function to constrain values in an output vector of the DNN between 0 and 1.

15. The system of claim 14, wherein the processor is configured to further execute the computer program instructions to:
estimate the instantaneous function by applying an inverse of the sigmoid activation function to the output vector of the DNN.

16. The system of claim 10, wherein the processor is configured to further execute the computer program instructions to:
perform mean and variance normalization of corresponding values in the frequency channels of the audio frame.

17. The system of claim 10, wherein the instantaneous function is a logarithmic ratio of the clean audio spectrum and the noisy audio spectrum of the audio frame.

18. The system of claim 10, wherein the DNN is trained with a binary cross entropy loss function.

* * * * *